United States Patent
Gao et al.

(10) Patent No.: US 11,308,297 B2
(45) Date of Patent: Apr. 19, 2022

(54) SELF-CHECKOUT SYSTEM WITH SCAN GATE AND EXCEPTION HANDLING

(71) Applicant: Datalogic USA, Inc., Eugene, OR (US)

(72) Inventors: WenLiang Gao, Eugene, OR (US); Bryan L. Olmstead, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 44 days.

(21) Appl. No.: 15/965,622

(22) Filed: Apr. 27, 2018

(65) Prior Publication Data

US 2018/0314863 A1 Nov. 1, 2018

Related U.S. Application Data (60) Provisional application No. 62/491,140, filed on Apr. 27, 2017.

(51) Int. Cl.
*G06K 7/10* (2006.01)
*A47F 9/04* (2006.01)
*G06K 7/14* (2006.01)
*G01G 19/414* (2006.01)

(52) U.S. Cl.
CPC ............ *G06K 7/1096* (2013.01); *A47F 9/048* (2013.01); *G01G 19/4144* (2013.01); *G06K 7/10831* (2013.01); *G06K 7/10861* (2013.01); *G06K 7/10881* (2013.01); *G06K 7/1456* (2013.01)

(58) Field of Classification Search
USPC ......................................................... 235/383
See application file for complete search history.

(56) References Cited

U.S. PATENT DOCUMENTS

| | | | |
|---|---|---|---|
| 4,881,606 A | 11/1989 | Halfon et al. | |
| 5,115,888 A | 5/1992 | Schneider | |
| 6,330,973 B1 * | 12/2001 | Bridgelall | G06K 7/10564 235/462.01 |
| 7,040,455 B2 | 5/2006 | Bogat | |
| 7,337,960 B2 | 3/2008 | Ostrowski et al. | |
| 7,909,248 B1 | 3/2011 | Goncalves | |
| 8,430,311 B2 | 4/2013 | Ostrowski et al. | |
| 8,919,653 B2 | 12/2014 | Olmstead | |
| 8,939,369 B2 | 1/2015 | Olmstead | |
| 9,004,359 B2 | 4/2015 | Shearin | |
| 9,082,142 B2 | 7/2015 | Svetal | |
| 9,239,943 B2 | 1/2016 | Svetal | |
| 10,055,626 B2 | 8/2018 | Beghtol et al. | |
| 2013/0306727 A1 * | 11/2013 | Shearin | G06K 7/10 235/440 |
| 2014/0180848 A1 * | 6/2014 | Argue | G07G 1/01 705/16 |
| 2015/0193761 A1 | 7/2015 | Svetal | |

FOREIGN PATENT DOCUMENTS

| | | |
|---|---|---|
| WO | 2012103067 A2 | 8/2012 |
| WO | 2014018187 A1 | 1/2014 |

* cited by examiner

*Primary Examiner* — Rafferty D Kelly
(74) *Attorney, Agent, or Firm* — Stoel Rives LLP (57) ABSTRACT

The disclosure relates to a self-checkout system including a base and a scan gate extending over at least a portion of the base, the scan gate having a field of view that encompasses 360-degree coverage of the items such that the scan gate is able to obtain and read encoded data on any surface of the item passing through the scan gate. The base may include one or more rails positioned along the periphery to help retain items on the surface of the base once they have been passed through the scan gate.

17 Claims, 7 Drawing Sheets

SELF-CHECKOUT SYSTEM WITH SCAN GATE AND EXCEPTION HANDLING

RELATED APPLICATION DATA

This application is a nonprovisional of and claims the benefit under 35 U.S.C. § 119(e) of U.S. Provisional Patent Application No. 62/491,140, filed Apr. 27, 2017, the disclosure of which is incorporated by reference herein in its entirety.

BACKGROUND

The field of the present disclosure relates generally to self-checkout systems including data reading systems and weigh scales such as those, for example, located at and combined with a data reader device into a scanner-scale system.

Some data reading systems may incorporate a bar code scanning system and a scale apparatus for measuring weights of produce and other items sold by weight. The scale apparatus typically has a load cell and a weigh platter which rests on a load cell or cells. In many such systems, the weigh platter may expose the scale to inaccurate weighing when articles placed on the scale extend beyond the perimeter of the scale surface and onto the checkout counter or other area. In such a situation, where the item comes to rest partly on the top surface of the checkout counter, the scale would record a lower weight than the item actually weighs resulting in a loss of revenue for the retailer due to this inaccurate weighing. Moreover, in self-checkout systems, this problem may be exacerbated by customers that may not understand how to properly weigh items or customers that are actively trying to deceive the weigh scale by purposely arranging items beyond the scale perimeter.

Many data reading systems, particularly self-checkout systems, typically include a separate second scale to check the weight of the scanned items and the by-weight items (e.g., for produce, meat, or other items) to ensure that the weight of the customer's items matches the expected weight of the items. If item weights do not match, the system may alert the customer and/or a store clerk to and require rescanning to correctly process the item.

The present inventors have identified several disadvantages of these data reading systems. For example, many existing self-checkout systems have separate scanning and loss prevention scales, thereby requiring additional space for the scanning system and reducing the number of self-checkout systems that a store may employ. In addition, such self-checkout systems typically use a bi-optic scanner arrangement that has limited viewing angles for capturing barcodes on items. Moreover, such systems typically do not incorporate any exception handling techniques that will help quickly resolve inaccurate scanning events without requiring rescanning of the item. Accordingly, the present inventors have determined that it would be desirable to have a data reading system with improved scanning and weighing performance features to improve loss prevention measures and provide a more simplified self-checkout scanning process for easy use by customers. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
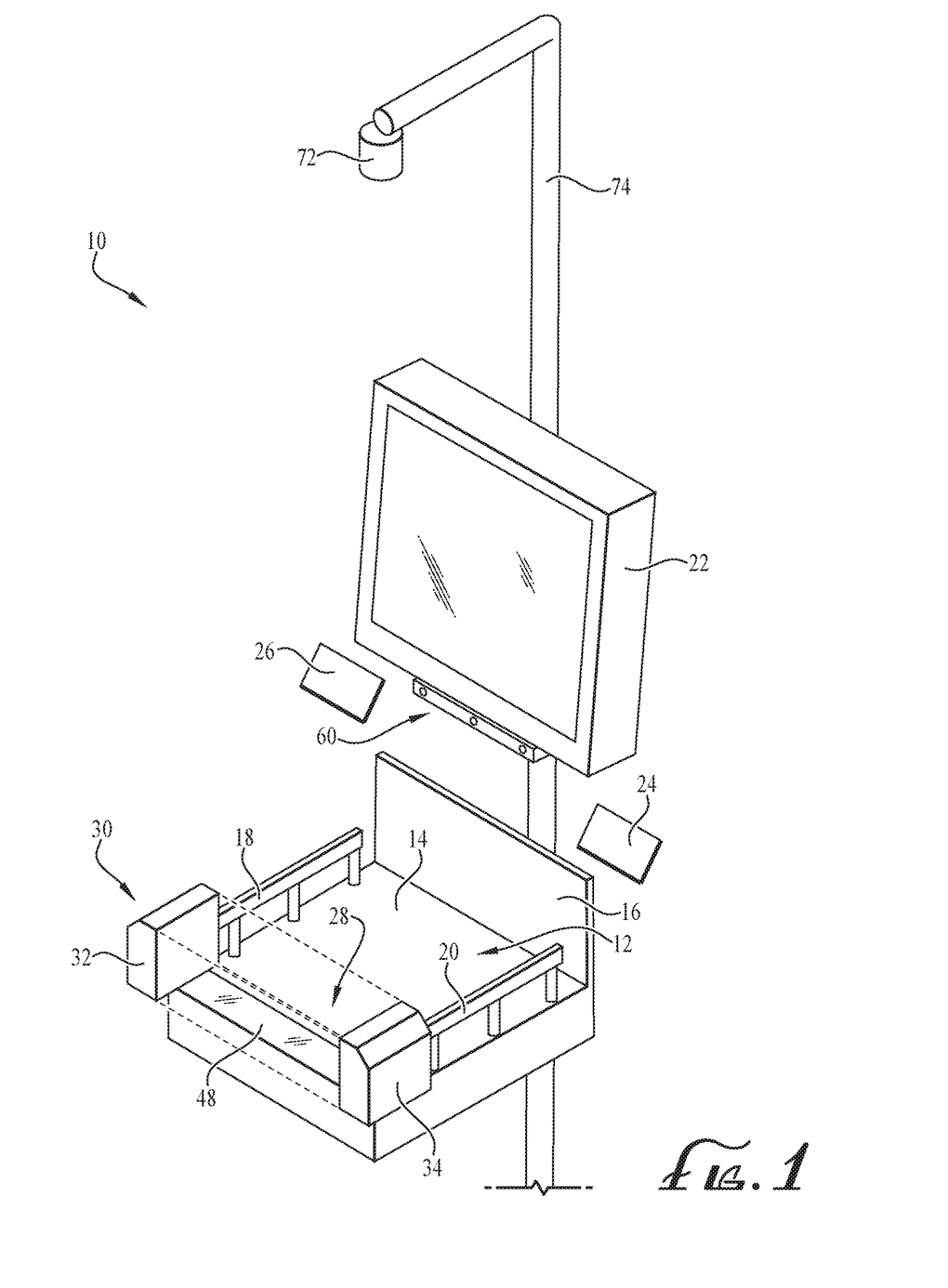
FIG. 1 illustrates a view of a self-checkout system for weighing and scanning items in accordance with one embodiment.
Figures 2, 3:
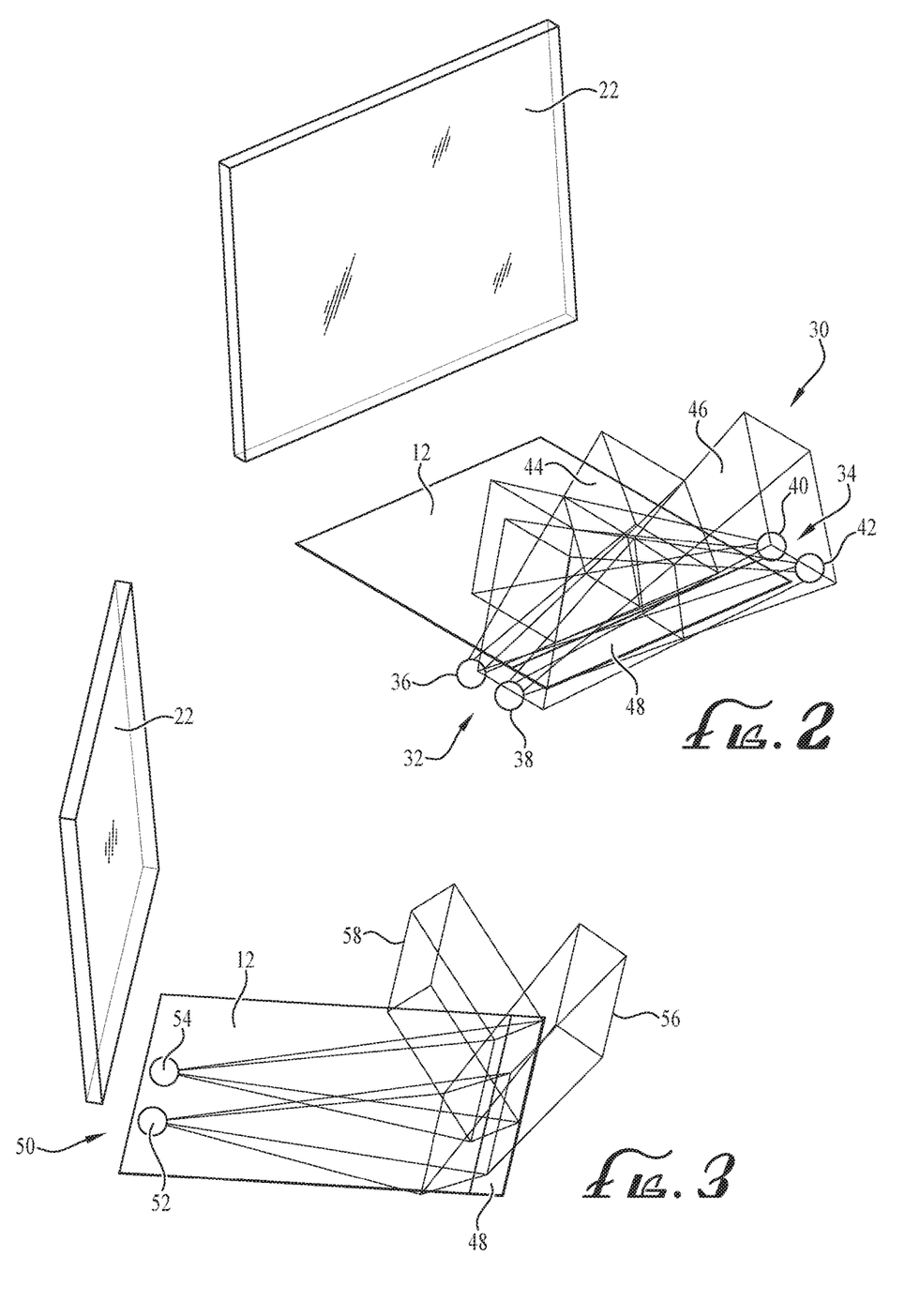
FIGS. 2-4 are schematic illustrations of the scanning fields for a side data reader system, a bottom data reader system, and a top data reader system of the self-checkout system of FIG. 1.

FIG. 1 illustrates a self-checkout system 10 according to one embodiment. As is discussed in further detail below, the self-checkout system 10 may be used by a customer to scan, weigh, and pay for items 78 (see FIG. 6) without the need for assistance by a store clerk or other personnel. In an example operation, a customer approaches the self-checkout system 10 and places items 78 one item at a time onto the platter 12, ensuring that each item 78 is moved through the read region of the scan gate 28 prior to placement on the platter 12. With reference to FIGS. 1-3, the read region is collectively formed by multiple data reader systems 30, 50, 60 of the self-checkout system 10. The platter 12 rests on a load cell(s) (not shown) and weighs each item 78 after it is placed on the platter 12, the platter 12 settle the weight prior to accepting a subsequent item 78 in the transaction. As the items 78 are transferred onto the platter 12, the barcode label or other optical data (such as digital watermarks, pattern features, and dimensions) of the items 78 is captured when the item 78 moves across the read region of the scan gate 28. Thereafter, the self-checkout system 10 queries a store network or database 84 (see FIG. 7) and obtains item data matching the captured barcode data, the item data including the weight and identity of the item 78. With the item 78 on the platter 12, the self-checkout system 10 compares the recorded weight of the item 78 (as measured by the platter 12) with the weight of the item obtained from the store database 78.

If the weight and item information do not match, then the customer (and/or other personnel) may be alerted to the potential error. In such cases, the self-checkout system 10 may display an exception image on the touch screen 22 and request that the customer resolve the read error (hereinafter generally referred to as an exception) as further discussed in detail below. If the item has no label or no label exists on the item (e.g., produce), the self-checkout system 10 may prompt the user to enter information for the item (such as via the touch screen 22) to continue the transaction. In other embodiments, the self-checkout system 10 may identify the item 78 based on captured images of the item 78 and prompt the user to confirm that the identity of the item 78 is correct to resolve the exception.

Once the exception is cleared, or if no exception occurred (i.e., the recorded and item weight information matches), then the user continues the transaction until all items 78 are processed. In some embodiments, the self-checkout system 10 may further include a security camera 72 for observing the bagging area and monitor the self-checkout process to ensure all items are properly scanned and paid for. Additional details of these and other embodiments are further discussed below with reference to the accompanying figures.

With reference to FIG. 1, the self-checkout system 10 includes a platter 12 for weighing retail items, such as produce or bulk items, at the point-of-sale. The weigh platter 12 may be generally rectangular as shown in FIG. 1, or may comprise another suitable shape as desired. The weigh platter 12 may include an integrated two-plane weigh platter (or other single-plane or multi-plane weigh platter) that allows items to be placed on a substantially horizontal portion 14 of weigh platter 12, a substantially vertical portion 16 of weigh platter 12, or both simultaneously, to be weighed. One such two-plane weigh system is the All-Weighs® platter system available from Datalogic Scanning, Inc. of Eugene, Oreg., further described in U.S. Pat. No. RE40,071, the disclosure of which is hereby incorporated by reference in its entirety. The platter 12 may include side rails or shoulders 18, 20 extending above the horizontal surface 14 and arranged along the periphery or edges of the platter 12, with the side rails 18, 20 being generally orthogonal to the vertical portion 16 of the weigh platter 12 as illustrated in FIG. 1. The side rails 18, 20 may be provided to help rest large and/or bulky items for accurate weighing on the platter 12, and/or to help keep items from rolling or otherwise falling off the platter 12. In addition, the side rails 18, 20 may help remind customers to place items on the platter 12 by moving them across the scan window 48 for accurate reading.

The self-checkout system 10 further includes a scan gate 28 defined as a reading region formed by the collective scanning fields of a variety of data reader systems, including a side data reader system 30, a bottom data reader system 50 (see FIG. 3), and a top data reader system 60, where each system includes a plurality of data readers, such as imaging-based readers including solid state image circuitry (e.g., charge coupled devices (CCDs) or CMOS imagers) operable to capture a barcode from the items 78 when the items 78 are moved across the reading area. In one embodiment, the side data reader system 30 is generally aligned with the rails 18, 20 along the peripheral edges of the platter 12, with the side data reader system 30 having a read region or view volume extending horizontally across the platter 12 (see FIG. 2). The bottom data reader system 50 directs its view volume up through the scan window 48 on the platter 12 and partially overlaps with the view volume of the side data reader system 30 (see FIG. 3). Finally, the top data reader system 60 directs its view volume generally downwardly toward the scan window 48 and partially overlaps with the view volumes of the side data reader system 30 and the bottom data reader system 50 (see FIG. 4). The collective view volumes of the data reader systems 30, 50, 60 form the scan gate 28 and provide the self-checkout system 10 with 360-degree coverage to read a barcode label on any surface of the items 78 being read/scanned. Additional details of the scan gate 28 and its various data reader systems 30, 50, 60 are further described below with particular reference to FIGS. 2-4.

Referring back to FIG. 1, the self-checkout system 10 further includes a touch screen 22 that may display information, such as application icons, images, text, or other suitable information thereon, for aiding the customer with the transaction. For example, the touch screen monitor 22 may display transaction information (e.g., displaying transaction list and running costs, confirmation pictures of items, item price, etc.), and allow the customer to input data and interact with the self-checkout system 10 to manage the transaction. The touch screen 22 may be any one of a variety of display types, such as an integrated liquid crystal display (LCD), an organic light-emitting diode (OLED), or other suitable display preferably with touch screen capabilities for detecting the operator's touch via a finger, stylus, or other device. In addition to displaying transaction information, the touch screen 22 may indicate to customers whether an exception event has occurred during scanning (e.g., the scanned item was not properly read or does not include a barcode label). As further described in detail with reference to FIG. 5, the touch screen 22 may be used in conjunction with the exception/security camera 72 to resolve such exceptions.

In some embodiments, the self-checkout system 10 may further include a payment terminal 24 for accepting credit card payments and a receipt printer 26 for dispensing receipts at the conclusion of the transaction. In some embodiments, the receipt printer 26 may further be operable to generate a QR code which can be presented to a teller or other machine for completing the transaction with a cash payment.

Figure 4:
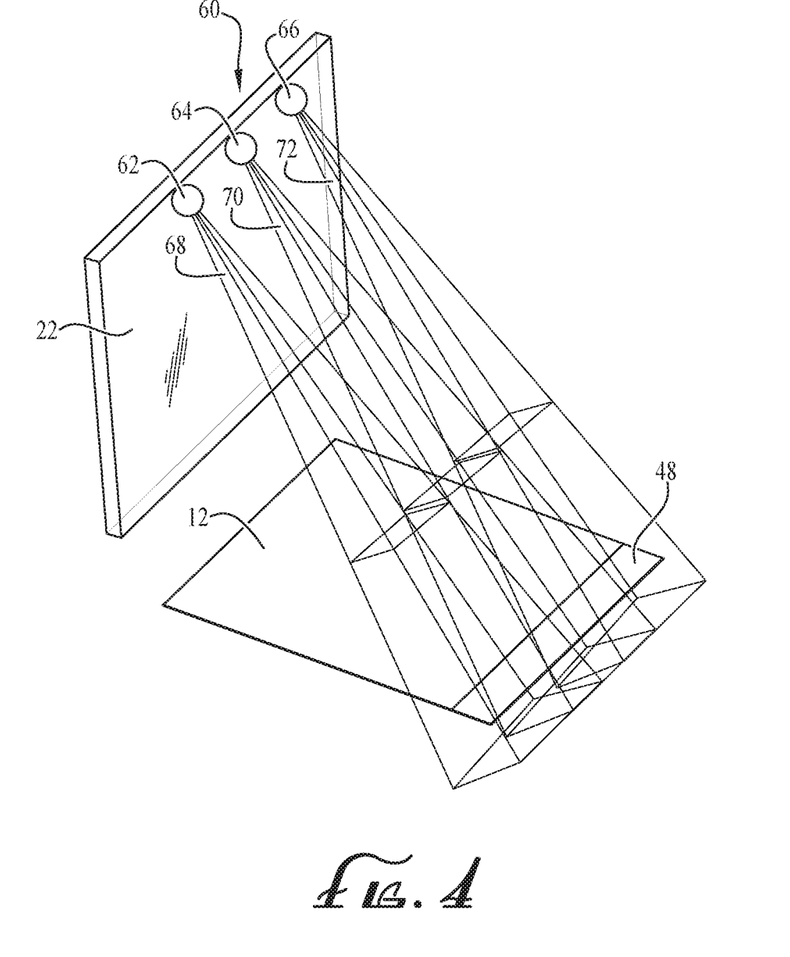

With reference to FIGS. 2-4, the following section describes additional details of the scan gate 28 and each of its data reading systems 30, 50, 60 operable to collectively generate a read volume for scanning/reading items via the self-checkout system 10. As noted previously, the scan gate 28 includes a side data reader system 30, a bottom data reader system 50, and a top data reader system 60. The following section proceeds with description of each of these systems in turn with general reference to FIGS. 2-4.

FIG. 2 is a schematic illustration relating to the side data reader system 30 of the self-checkout system 10, with certain components from FIG. 1 removed for clarity. With reference to FIG. 2, the side data reader system 30 includes a first data reader 32 arranged along a first peripheral or lateral edge of the platter 12 and adjacent the side rail 18 (see FIG. 1), and a second data reader 34 arranged along a second peripheral or lateral edge of the platter 12 and adjacent the side rail 20 (see FIG. 1). In this configuration, the first and second data readers 32, 34 are positioned across from one another on the platter 12. It should be understood that reference to a "data reader" in the specification is used in an expansive sense to describe a data reader that may include a camera/imager or other imaging system, a microprocessor, a decoding unit, and a controller for communicating data to other data readers or external systems. The data readers may include different decoders (e.g., software algorithms, hardware constructs) to decode various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., aztec code, maxicode, QR code, high-capacity color barcode, data matrix) stacked codes (PDF417, GS1 Databar), and watermark and feature recognition. However, the term "data reader" is not intended to be limited to require each of these components. In some embodiments, a data reader may include a camera or other imaging system, and may not include a processor, decoding unit, and the controller. These components may be entirely external to the data reader itself, such as being a part an external system with which the data reader communicates. For example, the data reader may be a camera that obtains images of the item and communicates or transmits those images to an external database for decoding and processing. While it is generally understood that a camera is typically a combination of a lens and an imaging device or sensor array, the terms imager (or imaging system) and camera may be used interchangeably herein.

As illustrated in FIG. 2, the data readers 32, 34 each include one or more imagers housed within the respective data readers 32, 34. For example, with reference to FIG. 2, the first data reader 32 includes a first imager 36 and a second imager 38 offset from one another, and the second data reader 34 includes a third imager 40 and a fourth imager 42 offset from one another. To avoid repetition, the following discussion proceeds with particular reference to the data reader 32 and its components, with the understanding that the same description and principles apply equally to the data reader 34 and its components.

As shown in FIG. 2, the first imager 36 directs a view volume 44 generally horizontally across a region of the platter 12 and over the scan window 48 toward the second data reader 34. Similarly, the second imager 38 directs a view volume 46 horizontally across a region of the platter 12 and over the scan window 48 toward the second data reader 34. In some embodiments, the view volumes may have staggered depths to achieve the read range across the platter 12, and/or the view volumes may be stacked on top of each other to create greater read height. For example, with reference to FIG. 2, view volume 44 may have a shorter range (e.g., covering approximately ⅔ of the length of the platter 12) as compared to the view volume 46 (which may cover the entire length of the platter 12), but with a field of view that reaches a higher height, as compared to the height of the view volume 44, to capture/read the barcode label on taller items. In this arrangement, the respective view volumes 44, 46 of the imagers 36, 38 include overlapping and non-overlapping portions to effectively capture images of the items moving across the platter 12 and better ensure that a barcode label is captured regardless of item dimension and movement plane across the scan window 48.

As mentioned previously, the third and fourth imagers 40, 42 of the second data reader 34 may be arranged in a similar fashion, but with their respective view volumes directed toward the first data reader 32. In this configuration, substantial portions of the view volumes of the first and second data readers 32, 34 overlap one another, with the view volumes generally aimed to capture one or more images of the barcode or other data positioned on either side surfaces of the item. In some instances, the images captured by the first and second data readers 32, 34 may be stitched together to recreate the entire barcode in cases where each data reader 32, 34 captures images of partial barcodes. After the images are stitched together, the recreated barcode may be processed and decoded. In other instances, the images with fragments of the barcode may be individually processed and the decoded barcode fragments may thereafter be stitched together to recreate the entire barcode.

FIG. 3 is a schematic illustration relating to the bottom data reader system 50 of the self-checkout system 10. With reference to FIG. 3, the bottom data reader system 50 includes a plurality of data reading devices housed underneath the platter 12 and generally oriented to direct a view volume through the scan window 48. The view volume of the data reader system 50 is arranged to read the bottom side of items 78 (and in some instances the leading and trailing edges of items), as the items 78 are passed or moved over the scan window 48. FIG. 3 illustrates one example arrangement of the data reader system 50 with a plurality of data readers 52, 54 arranged adjacent the vertical portion 16 of the weigh platter 12 (see FIG. 1). With reference to FIG. 3, the data reader 52 directs a view volume 56 toward the scan window 48, with the view volume 56 being redirected by imaging optics, such as a mirror or other reflective surface (not shown), upwardly through the scan window 48 beyond the platter 12 and toward the customer. In this arrangement, the view volume 56 may capture barcodes on the leading surface and the bottom surface) of the items 78 as they move across the scan window 48. Similarly, the data reader 54 directs a view volume 58 toward the scan window 48, with the view volume 58 being redirected by imaging optics, such as a mirror or other reflective surface (not shown), upwardly through the scan window 48 and generally toward the vertical portion 16 of the platter 12. In this arrangement, the view volume 58 may capture the bottom surface (and in some cases, may also capture the trailing surface) of the items 78 as they move across the scan window 48. In some embodiments, the scan window 48 may be made of sapphire to provide a robust window capable of withstanding continued abrasion from items 78 sliding over it. In other embodiments, the items 78 may not slide along the scan window 48 during the checkout process, but instead may be moved above the scan window 48. In such embodiments, the scan window 48 may be made of less abrasion-resistant materials to reduce the cost of the overall scanner system.

FIG. 4 is a schematic illustration relating to the top data reader system 60 of the self-checkout system 10. With reference to FIG. 4, the top data reader system 60 includes one or more data reading devices generally positioned above the vertical portion 16 of the platter 12. For example, in some embodiments, the top data reader system 60 may be positioned on and/or coupled to an upper portion of the touch screen 22 (as in FIG. 4) or may instead be positioned on/and or coupled to a lower portion of the touch screen 22 (as in FIG. 1). In either arrangement, the top data reader system 60 includes one or more data readers 62, 64, 66 generally oriented to direct a view volume 68, 70, 72, respectively, downwardly toward the platter 12 and over the scan window 48 to read the top side of items 78 (and in some instances the leading edges of items) as the items 78 are moved over the scan window 48. Preferably, the top data reader system 60 is positioned at a sufficient height above the platter 12 to accommodate larger items (i.e., to read the top surface of larger items).

Figure 5:
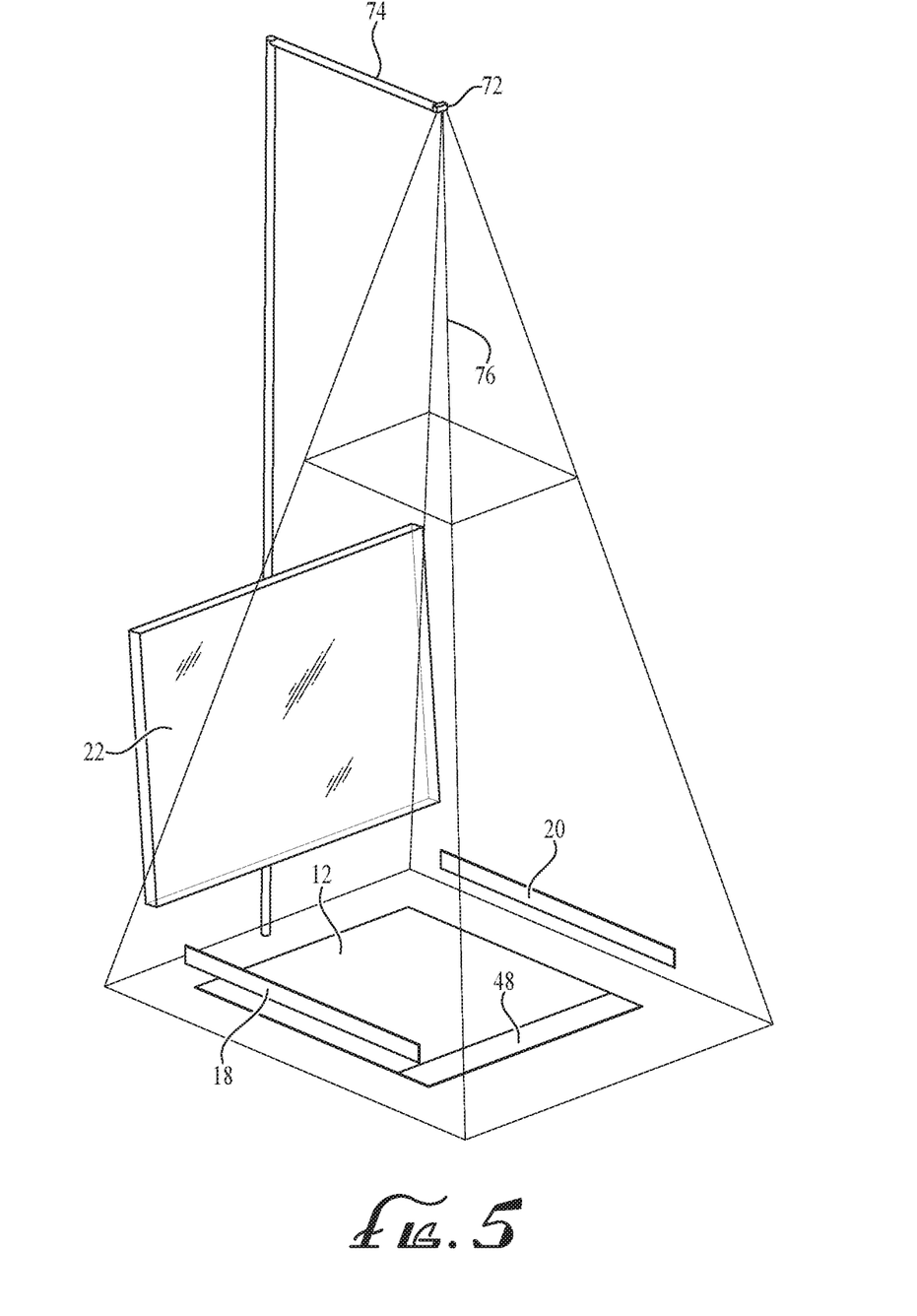
FIG. 5 schematically illustrates an example field of view of a top-down camera of the self-checkout system of FIG. 1.
Figure 6:
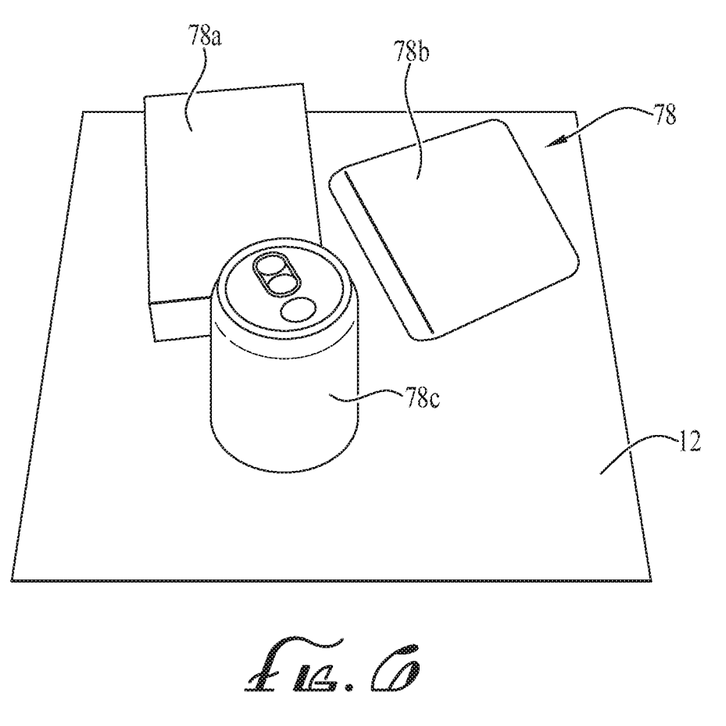
FIG. 6 illustrates an example exception handling scenario of the self-checkout system of FIG. 1.

As described, the arrangement of data reader systems 30, 50, 60 collectively captures a 360-degree view of the items as they pass over the scan window 48 and onto the platter 12 to help ensure an accurate read for all items. However, in some instances, the data reader systems 30, 50, 60 may encounter errors (also referred to as an "exception" hereinafter) when attempting to read an optical code on an object or the reader may simply fail to read the optical code. For instance, in some cases a barcode may be obscured by neighboring items, or an item may be missing a barcode, or a barcode may be difficult to read due to label quality or specular reflection issues. When an exception occurs, information relating to the exception is presented to the customer on the display screen 22 so that the customer can review and clear the exception (e.g., resolve the problem so that the items may be processed). With particular reference to FIGS. 5-6, the following sections describe further details of the exception handling features of the self-checkout system 10.

FIG. 5 schematically illustrates an example field of view of a top-down security or exception two-dimensional or three-dimensional camera 72 of the self-checkout system of FIG. 1. As illustrated in FIG. 1, the camera 72 may be attached to an end of a pole or other structure 74 extending above the platter 12 and touch screen 22 to position the camera 72 at an appropriate height for capturing the platter 12 and the area surrounding it. For example, with reference to FIG. 5, the camera 72 may be arranged with its view volume 76 directed generally downwardly and over the platter 12. In this configuration, the camera 72 is arranged to capture the scanning events during the transaction to ensure the transaction is properly completed. In some embodiments, the camera 72 may be a data reader for reading barcodes from items 78.

FIG. 6 schematically illustrates a variety of items 78 from the customer's transaction resting on the platter 12. In a typical transaction, the customer places one of the items 78a on the platter 12, where the data reading systems 30, 50, 60 collectively capture a barcode label for the item 78a. After capturing the barcode label, the weight of the item 78a is captured via the platter 12 to ensure that the barcode label and the item weight match for the particular item 78a. After the weight is settled for the first item 78a, a second item 78b may be scanned and read, followed by another round of weight settling before a third item 78c is scanned, and so on until all items 78 are processed. When multiple items 78 are placed simultaneously or the weight is not settled prior to the following item being placed on the platter 12, the self-checkout system 10 may check the total weight of items 78 in checkout volume to match between optical index data (barcode, watermark, dimension, and/or features) and weight.

To ensure accurate processing of all items 78, the self-checkout system 10 may employ a simple item tracking process to track an order of the items 78 as they are processed. In cases where a barcode is not captured by any of the data reading systems 30, 50, 60 for a particular item 78 in a sequence of the tracked items, the platter 12 will register a combined weight that is higher than the combined weight of the captured items, indicating that the last item (e.g., item 78c) in the sequence was not properly read. In such instances, the self-checkout system 10 may alert the customer by displaying an exception image of the exception item 78c on the display screen 22, and/or by providing an audible cue/message to the customer requesting that the exception item 78c be rescanned. The exception image may be generated using three-dimensional item reconstruction techniques, such as by using the first and third imagers 62, 66 of top data reader system 60 as a stereo camera system, using passive illumination or active infrared pattern projection to generate the three dimensional information potentially using an additional processor to compute a three-dimensional model from the stereo images. Regardless of the reconstruction technique, the display screen 22 may display an image of the exception item 78c with an annotated box, or other indication means could be used, such as light beams or indicators on rails 18, 20, to indicate that the item 78c was not properly read. To clear the exception, the customer may remove the item 78c from the platter 12 and rescan the item 78c, or may select options from the screen 22, such as matching the item 78c with an image of the item 78c suggested by the self-checkout system 10. In some cases, such as when the exception item is produce, the display screen 22 may request the customer to input the PLU number for the produce. Alternatively, a list of produce choices could be shown on the display screen 22 based on the most likely identity of the item 78c as determined by the self-checkout system 10 based on the item's size, shape, and color as measured by the various camera systems, thus aiding the customer in selecting the correct identity for item 78c, described in more detail below.

To ensure that multiple like-item purchases do not create unnecessary exceptions, the self-checkout system 10 may determine the label read position of the imagers (e.g., determine which imager captured the labels for each item), the weight of the items on the platter 12, and/or the position of the item on the platter 12 (based on the images from the various cameras/imagers) to determine whether the customer inadvertently scanned the same item twice or if the customer is purchasing multiple similar items. The self-checkout system 10 may generate an exception if it is determined that the customer inadvertently scanned the same item multiple times, and/or may seek confirmation from the customer that multiple items were purchased.

In some embodiments, the exception/security camera 72 may use warm white illumination and near IR technology to obtain spectrum data of the items 78 and provide suggestions for the customer. For example, the camera 72 may capture an image of a bunch of carrots, analyze the image, and present an icon for the carrots on the display screen 22 for the convenience of the user. The user may simply confirm the purchase by selecting the icon on the display screen 22 instead of having to look up and input the PLU code. A similar technique may be used to present exception images to the consumer for resolving exceptions as noted previously. A three-dimensional imaging system, implemented by a stereo camera system composed of cameras 62 and 66 for example, or by exception/security camera 72, can be used to measure the size and shape of the items 78 to aid in determining the identity. This can be used, for example, to distinguish between large and small items of the same color, or to distinguish between items of the same color but of different shape.

In other embodiments, the exception/security camera 72 may further be used as a loss prevention measure to monitor the self-checkout system 10 and ensure that customers are accurately tracking and paying for items 78. In one embodiment, the exception camera 72 may be used to capture images of the items 78 as they are processed to ensure that a customer is not entering a PLU for a by-weight item that does not match the item being purchased. For example, the camera 72 may acquire an image of the item and analyze the features in the image to generate an exception when the features in the image do not match the customer's entry, such as when a customer enters the PLU for a banana, but is purchasing an avocado.

In still other embodiments, the feed from the security camera 72 may be monitored by store personnel and/or recorded for future playback as needed. In addition, when exceptions are generated, an operator or teller may receive an alert (in addition to the alert received by the customer) to ensure that exceptions are being cleared properly. In cases where a customer may be generating multiple exceptions in one transaction, the teller may be alerted and may offer to help the customer complete the transaction.

It should be understood that self-checkout system 10 may include various modules or subsystems that perform various reading and processing tasks, in addition to the reading and processing tasks described previously. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

Figure 7:
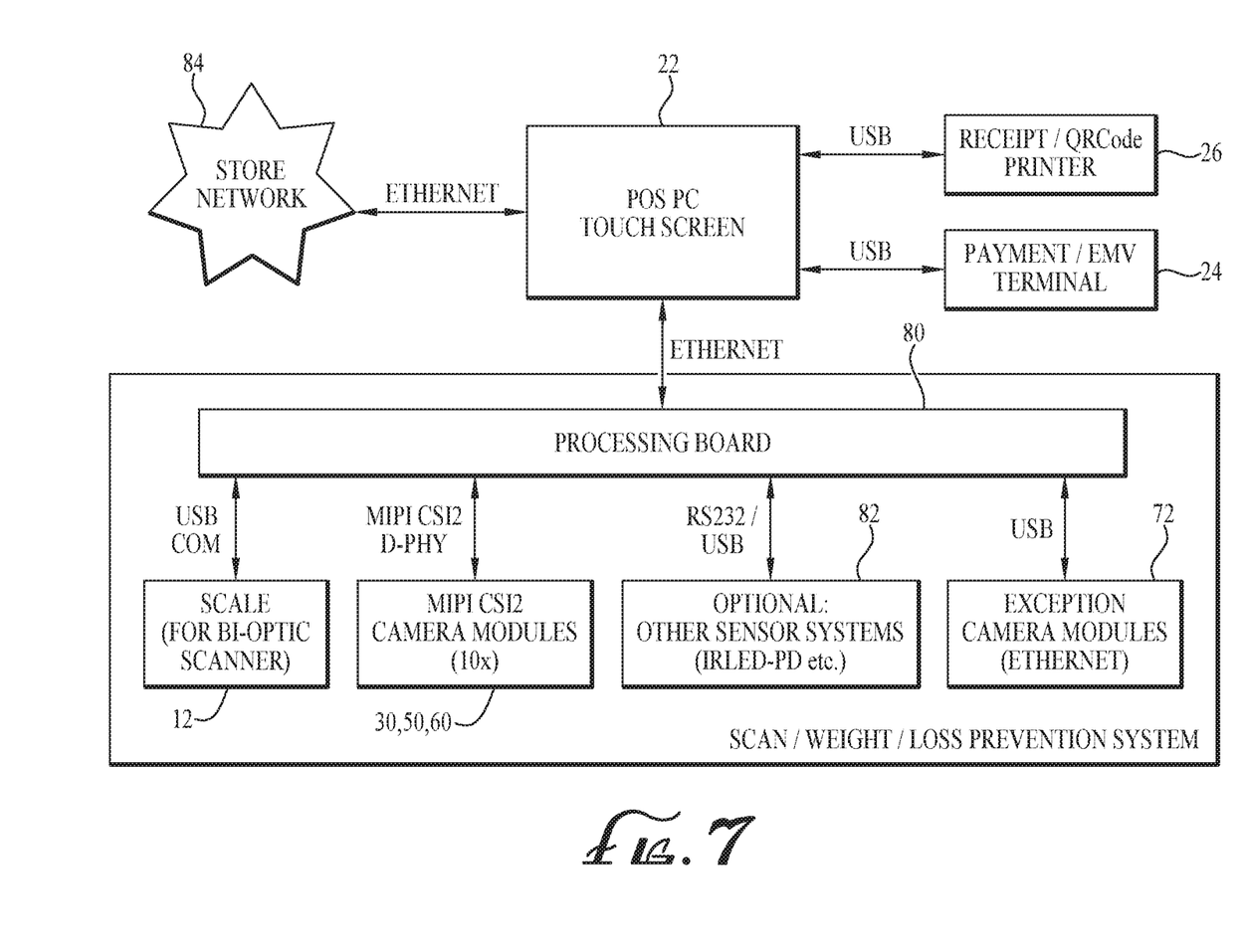
FIG. 7 is a system block diagram for the self-checkout system of FIG. 1.

FIG. 7 illustrates an example embodiment of a system block diagram for the self-checkout system 10 of FIG. 1. With reference to FIG. 7, the self-checkout system 10 includes a processing board 80 to which the weigh scale platter 12, the exception camera 72, and the data reader systems 30, 50, 60 are connected, such as via a bus-based architecture. In some embodiments, the self-checkout system 10 may further include additional sensor systems 82 connected to and controllable via the processing board 80. In addition, the touch screen 22 may be connected to the processing board 80, for example, via an Ethernet connection (or other display interface such as HDMI or VGA), with the receipt printer 24 and payment terminal 26 connected to the touch screen 22 (or connected directly to the processing board 80). The touch screen 22 may in turn be connected to a store network or server 84 via an Ethernet or wireless connection, where the server 84 contains item information for all items on sale (known as the Price Lookup Unit, or PLU). Alternatively, the PLU may be previously copied from the network 84 onto local storage in the self-checkout system 10. It should be understood that the system block diagram in FIG. 7 illustrates an example embodiment of a system architecture for the self-checkout system 10, and other arrangements may be possible without departing from the principles of the disclosed subject matter.

Figure 8:
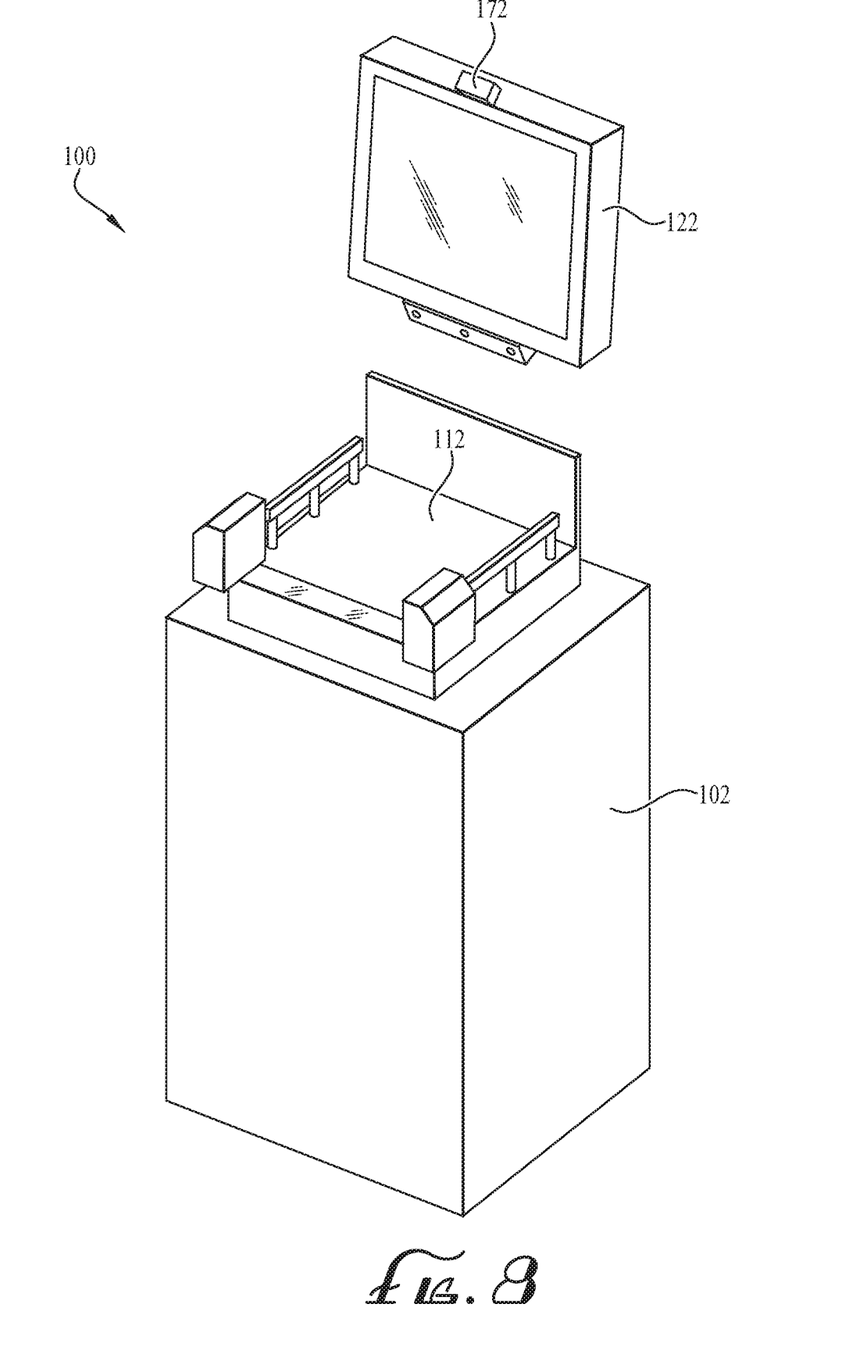
FIG. 8 illustrates a view of a self-checkout system for weighing and/or scanning items in accordance with another embodiment.

FIG. 8 illustrates another embodiment of a self-checkout system 100 mounted to a structure 102. The self-checkout system 100 may include many of the same or similar components as the self-checkout system 10. Accordingly, additional detail relating to these components is not provided to avoid obscuring more pertinent aspects of the embodiment with the understanding that those components may function in the same or similar manner as described with reference to FIG. 1. With reference to FIG. 8, the self-checkout system 100 includes a platter 112 and a touch screen 122 in a similar arrangement as the embodiment of FIG. 1. The self-checkout system 100 further includes a security camera 172 mounted to an upper portion of the touch screen 122, the camera 172 facing generally downwardly to direct its view volume (not shown) over the platter 112 in a similar fashion as the view volume 76 of the camera 72 of FIG. 1. In this embodiment, the placement of the camera 172 over the display screen 122 avoids the need to mount the camera on a pole extension as the embodiment in FIG. 1. In other embodiments, the structure 102 may be a wheeled structure to allow for maneuverability as desired. The arrangement in FIG. 8 may be best suited for compact spaces with a low height clearance where it may be difficult to accommodate a pole extension and mounted camera.

It should be understood that many of the components and arrangements described in the embodiments of FIGS. 1-8 are for illustration purposes. Accordingly, one having ordinary skill in the art may rearrange the components of the embodiments described herein without departing from the principles of the disclosure.

In addition, it is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A self-checkout system comprising:
   a display screen extending in a vertical plane configured to display transaction information to a self-checkout user when in use;
   a base extending in a horizontal plane including a top surface, a first lateral edge, a second lateral edge, a third lateral edge, and a fourth lateral edge on a periphery of the base, wherein the first and second lateral edges are opposite one another, the base configured for receiving one or more items on the top surface, and wherein the first lateral edge is on a left side of the base, the second lateral edge is on a right side of the base, the third lateral edge is on a front side of the base, and the fourth lateral edge is on a back side of the base when in use by the self-checkout user facing the display screen;
   a scan window disposed primarily within the front portion of the base in an offset manner relative to a center of the base such that the scan window is proximate the front side and less than an entire area of the base; and
   a plurality of data reading systems in operable communication with the display screen with scanning fields collectively defining a scan gate having a field of view that encompasses 360-degree coverage including top, bottom, and side views for each of the one or more items as the items pass through the scan gate over at least a portion of the base, the scan gate operable to obtain and read encoded data from each of the one or more items as the items pass through the scan gate and onto the top surface of the base, wherein the plurality of data reading systems include:
   a side data reading system including a first left side data reader positioned along the first lateral edge of the base, and a first right side data reader positioned along the second lateral edge of the base and opposite the first left side data reader, wherein each of the first left side data reader and the first right side data readers has a field of view oriented in a generally horizontal direction across the base and the scan window, the fields of view at least partially overlapping one another to provide the side views of the items as they pass through the scan gate;

a bottom data reading system including a first bottom data reader housed underneath the top surface of the base, wherein the first bottom data reader has a field of view projecting through the scan window disposed in the base and at least partially overlapping the fields of view of the data readers of the side data reading system to provide the bottom view of the items as they pass through the scan gate; and a top data reading system including a first top data reader positioned over the base having a generally downward field of view directed at the scan window and at least partially overlapping the fields of view of the data readers of the side and bottom data reading systems to provide the top view of the items as they pass through the scan gate, wherein the combined field of view of the scan gate is offset from a center of the base in a manner that is directed primarily at a front portion of the base that is proximate the front side and less than an entire area of the base.

2. The self-checkout system of claim 1, wherein at least a portion of the scan gate extends beyond the third lateral edge on the periphery of the base.

3. The self-checkout system of claim 1, wherein the base includes a weigh platter including a scale operable to weigh the one or more items on the top surface of the weigh platter.

4. The self-checkout system of claim 1, wherein the top data reading system includes a second top data reader positioned over the base and spaced apart from the first top data reader, wherein the second top data reader has a generally downward field of view directed at the scan window and at least partially overlapping the fields of view of the data readers of the side and bottom data reading systems to provide the top view of the items as they pass through the scan gate.

5. The self-checkout system of claim 1, further comprising an exception identification system configured to detect an exception item that has been transported through the scan gate without being successfully identified by any of the plurality of data reading systems.

6. The self-checkout system of claim 5, wherein the display screen is further configured to present an image of the exception item, and receive input from the self-checkout user for resolving the exception.

7. The self-checkout system of claim 6, further comprising an overhead camera positioned over the base and having a field of view directed generally downwardly and covering the base, the overhead camera configured to acquire an image of the exception item.

8. The self-checkout system of claim 1, further comprising:

a payment terminal system operable for receiving payment from a user; and a printer operable to print transaction information for a user.

9. The self-checkout system of claim 3, further comprising a processor in operable communication with the base and the plurality of data reading systems, the processor receiving weight information for the item from the base and also receiving the encoded data for the item from one or more of the plurality of data reading systems, the processor further configured to query item information from a server based on the encoded data and compare an item weight measured by the base with a recorded item weight stored in the server for the item.

10. The self-checkout system of claim 1, further comprising a first rail arranged along the first lateral edge and a second rail arranged along the second lateral edge, the first and second rails configured for retaining the one or more items on the top surface of the base, and wherein at least one of the first rail or the second rail is configured to provide an indication of a decoding result of the encoded data from each of the one or more items.

11. The self-checkout system of claim 10, wherein the decoding result is an exception responsive to the one or more items not being read.

12. The self-checkout system of claim 3, further comprising a processor a processor in operable communication with the base and the plurality of data reading systems, the processor receiving weight information for the item from the base and also receiving the encoded data for the item from one or more of the plurality of data reading systems, the processor further configured to:

decode the encoded data captured for the one or more items;

receive a weight for the one or more items determined by the weigh platter; and issue an exception if the measured weight is different than an expected weight of the one or more items.

13. The self-checkout system of claim 12, wherein the one or more items is a plurality of items and the measured weight is a combined weight for the one or items resting on the weigh platter.

14. The self-checkout system of claim 7, wherein the overhead camera is configured to use warm white illumination and near IR technology to obtain spectrum data of the items for the display screen to provide suggestions for the customer in response to the exception item being detected.

15. The self-checkout system of claim 7, wherein the overhead camera is a security camera configured to observe a bagging area and monitor the self-checkout process to detect if items are not properly scanned and paid for.

16. The self-checkout system of claim 7, wherein the first top data reader is coupled to an upper portion of the display screen.

17. The self-checkout system of claim 7, wherein the first top data reader is coupled to a lower portion of the display screen.

* * * * *